United States Patent
Ahn

(10) Patent No.: US 7,159,932 B2
(45) Date of Patent: Jan. 9, 2007

(54) CARRIER MOUNTING STRUCTURE

(75) Inventor: Sung-Yong Ahn, Yongin-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 370 days.

(21) Appl. No.: 10/744,004

(22) Filed: Dec. 24, 2003

(65) Prior Publication Data

US 2005/0103822 A1 May 19, 2005

(30) Foreign Application Priority Data

Nov. 19, 2003 (KR) .................. 10-2003-0082290

(51) Int. Cl.
*B06R 27/00* (2006.01)

(52) U.S. Cl. ................. 296/193.09; 296/203.02; 296/102

(58) Field of Classification Search ........... 296/193.09, 296/203.02, 102
See application file for complete search history.

(56) References Cited

U.S. PATENT DOCUMENTS

| 6,216,810 | B1 |   | 4/2001 | Nakai et al. |            |
|-----------|----|---|--------|--------------|------------|
| 6,698,822 | B1 | * | 3/2004 | Adamski      | 296/203.02 |
| 6,886,872 | B1 | * | 5/2005 | Matsumoto et al. | 293/115 |
| 2001/0026072 | A1 | * | 10/2001 | Sato et al.  | 293/115 |
| 2004/0041439 | A1 | * | 3/2004  | Kafuku et al. | 296/193.09 |
| 2004/0160088 | A1 | * | 8/2004  | Staargaard et al. | 296/193.09 |
| 2005/0134068 | A1 | * | 6/2005  | Pfister et al. | 296/29 |

FOREIGN PATENT DOCUMENTS

JP    0-329753    12/1998

OTHER PUBLICATIONS

English Language Abstract of JP 10-329753.

* cited by examiner

*Primary Examiner*—Lori L. Coletta
(74) *Attorney, Agent, or Firm*—Greenblum & Bernstein, P.L.C.

(57) ABSTRACT

A carrier mounting structure, in which knobs for connecting a lower frame of a carrier to a bumper cover are formed integrally with the lower frame so that a connection step between the knobs and the lower frame is omitted, thereby decreasing the number of steps of an overall assembly process and reducing the production cost of the carrier. The carrier mounting structure comprises a carrier provided in front of an engine compartment of a car body for fixing electric components of a car, a bumper cover located below the carrier for absorbing impact generated in external collision, and a plurality of knobs extended from a lower surface of the carrier and connected to the bumper cover, wherein the knobs are formed integrally with the carrier.

2 Claims, 3 Drawing Sheets

CARRIER MOUNTING STRUCTURE

RELATED APPLICATION

The present disclosure relates to subject matter contained in Korean application No. 2003-82290, filed on Nov. 19, 2003, which is herein expressly incorporated by reference its entirety.

BACKGROUND OF THE INVENTION

1. Field of the Invention

The present invention relates to a carrier mounting structure, and more particularly to a carrier mounting structure, in which knobs for connecting a lower frame of the carrier and a bumper cover are formed integrally with the lower frame so that a bolt-locking step between the lower frame and the knobs is omitted, thereby decreasing the number of steps for the assembly process and reducing production costs.

2. Description of the Related Art

Generally, a carrier for vehicles is obtained by assembling a headlight, a radiator, a condenser, a bumper and a panel of a vehicle into one unit so that assembly efficiency of the carrier on the spot is improved, and applies an FEM (Front End Module) technique for assuring assembly accuracy of the carrier products.

As shown in FIG. 1, a conventional carrier 10 comprises headlight-receiving portions 11 formed at both sides, cooling module-receiving portions 12 formed at a rear portion for accommodating cooling modules (not shown) such as a radiator and a condenser, a supporting bracket 14 extended from a central area of an upper frame 13 formed on upper surfaces of the cooling module-receiving portions 12 for installing a horn speaker for vehicles, etc. thereon, and a lower frame 15 formed on lower surfaces of the cooling module-receiving portions 12 for installing a bumper, fog lights, etc. thereon.

As shown in FIGS. 2 and 3, a bumper cover 20 is connected to the lower frame 15.

Here, mounting brackets 22 are installed on a lower portion of the lower frame 15 of the carrier 10 such that the mounting brackets 22 are spaced apart at a set interval.

Each of the mounting brackets 22 has an L-shaped structure, which goes downward from the lower frame 15 and then is bent frontward (as shown in FIGS. 2 and 3).

One end of each of the mounting brackets 22 is fixed to the lower frame 15 by means of a bolt 23, and the other end of each of the mounting brackets 22 contacts an upper surface of the bumper cover 20 and then is connected to the bumper cover 20 by means of a retainer 25.

Since the above conventional carrier 10 requires the mounting brackets 22 in order to connect the bumper cover 20 to the lower frame 15 of the carrier 10 and the ends of each of the mounting brackets 22 are respectively fixed to the lower frame 15 and the bumper cover 20 by means of the bolts 23 and the retainers 25, the number of steps of an assembling process of the conventional carrier 10 increases, thereby lowering the efficiency in assembling the carrier 10 and reducing productivity.

Further, in case the bumper cover 20 is disassembled from the carrier 10 when a car body is repaired due to damage or breakage and then assembled again to the carrier 10 after the repair of the car body, a working location between the bumper cover 20 and the carrier 10 are excessively low, thereby being inconvenient and difficult for workers.

SUMMARY OF THE INVENTION

Therefore, the present invention has been made in view of the above problems, and it is an object of the present invention to provide a carrier mounting structure, in which knobs are formed integrally with a lower frame of a carrier so that a bumper cover is fixed to the knobs, thereby decreasing the number of steps of an overall assembly process, reducing production costs, and improving productivity.

In accordance with the present invention, the above and other objects can be accomplished by the provision of a carrier mounting structure comprising: a carrier provided in front of an engine compartment of a car body for fixing electric components of a car; a bumper cover located below the carrier for absorbing the impact generated in a collision; and a plurality of knobs extended from a lower surface of the carrier, and connected to the bumper cover, wherein the knobs are integrated with the carrier.

Preferably, each of the knobs has an L-shaped structure, and includes support protrusions for maintaining the rigidity of the knobs.

The carrier mounting structure is designed such that the knobs for connecting the carrier to the bumper cover are integrated with the lower frame of the carrier so that a connection step between the knobs and the lower frame is omitted, thereby shortening assembly time and reducing the production cost of the carrier.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

Figure 1:
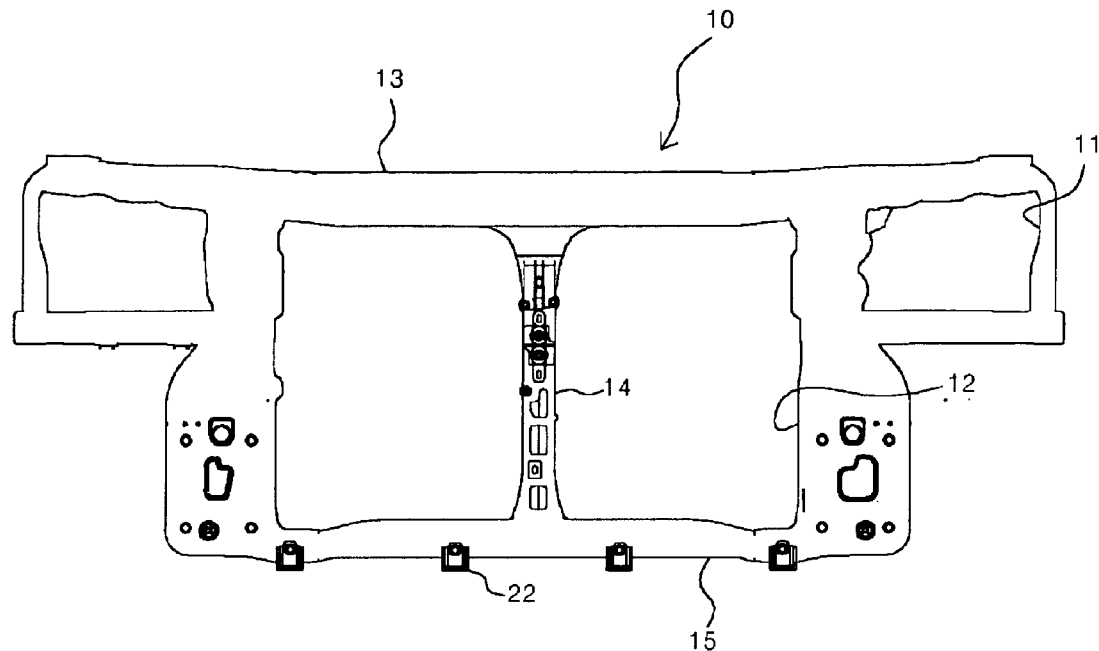
FIG. 1 is a front view of a conventional carrier for vehicles.
Figure 2:
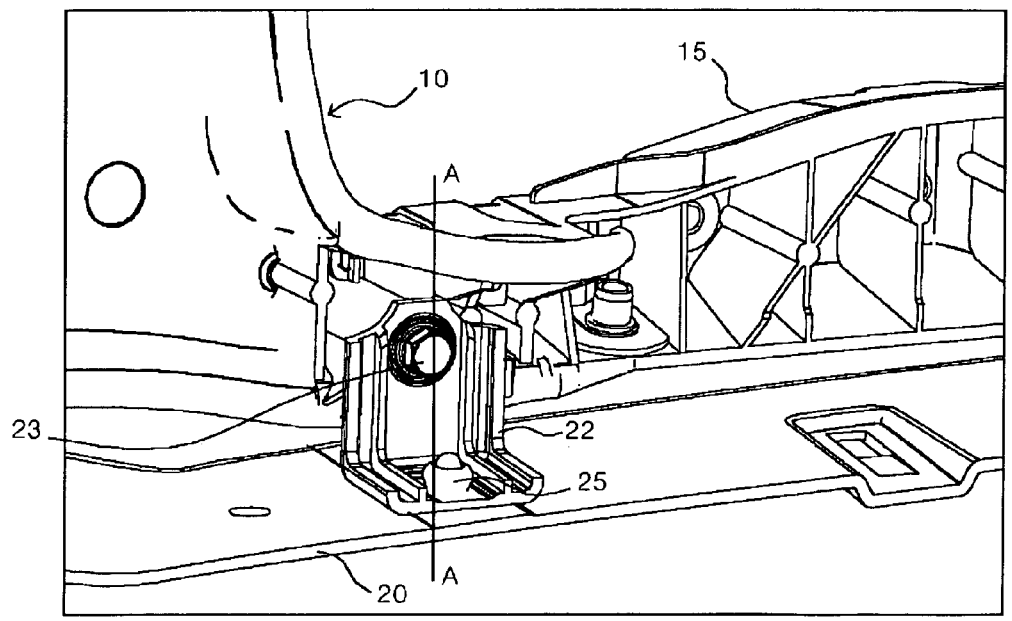
FIG. 2 is an enlarged view illustrating connection between the conventional carrier and a bumper cover located under the carrier.
Figure 3:
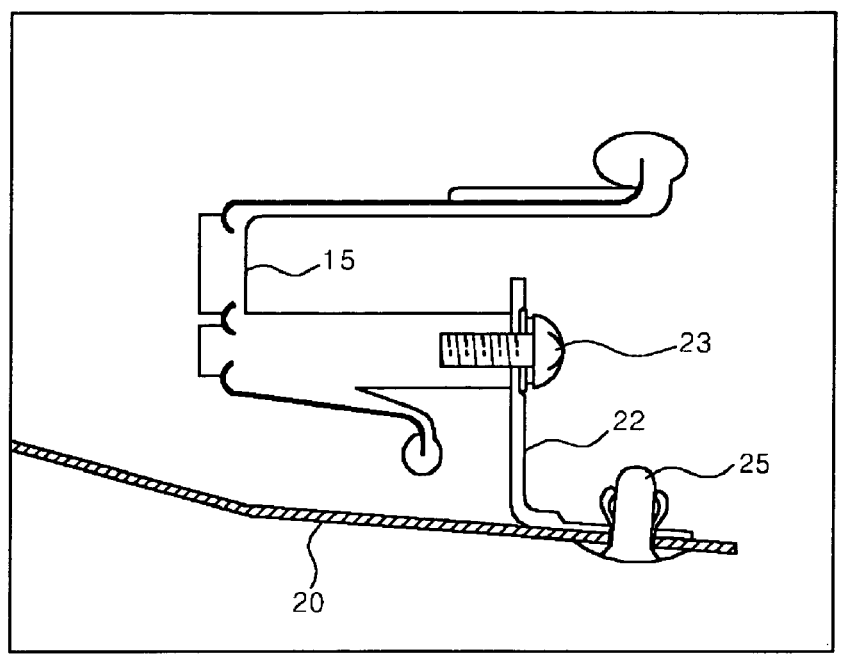
FIG. 3 is a cross-sectional view taken along the line A—A of FIG. 2.
Figure 4:
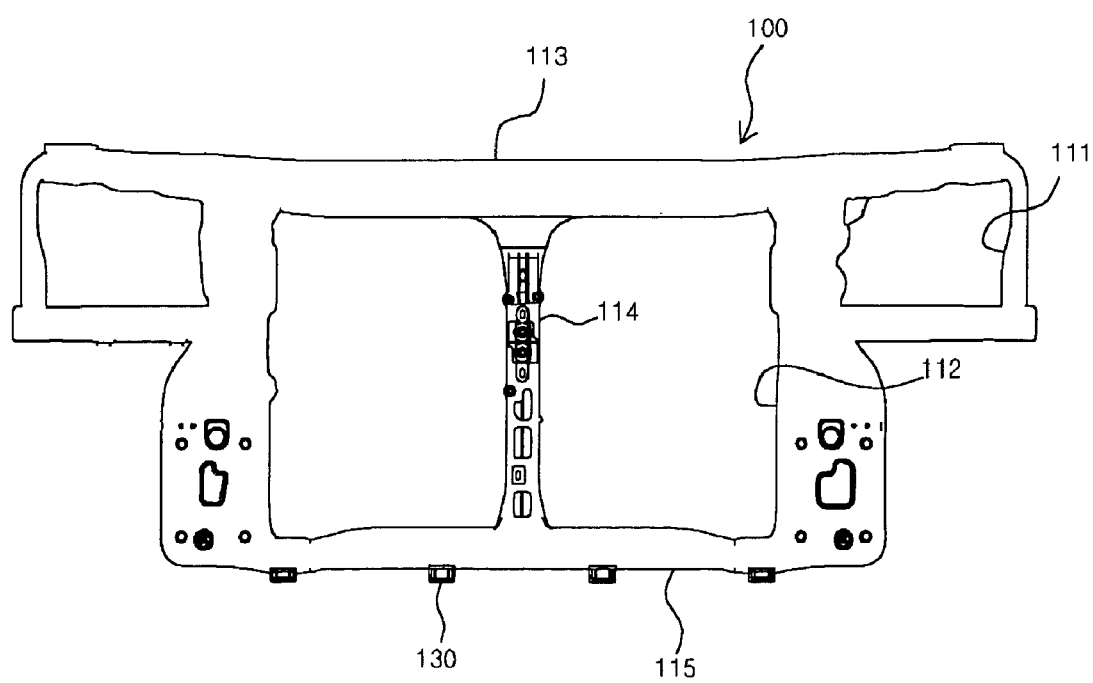
FIG. 4 is a front view of a carrier for vehicles in accordance with the present invention.
Figure 5:
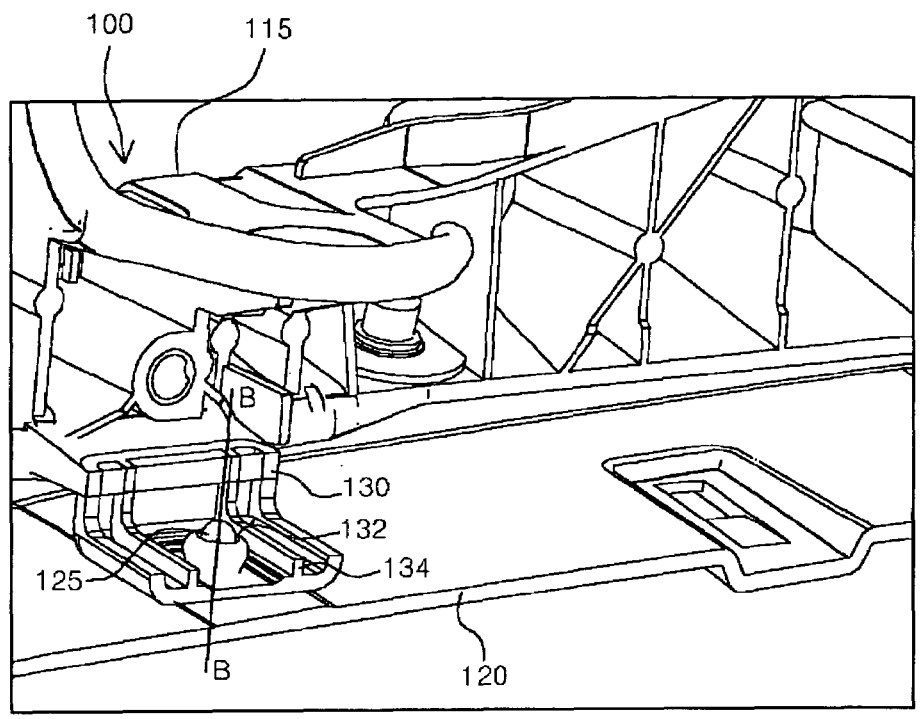
FIG. 5 is an enlarged view illustrating connection between the carrier of the present invention and a bumper cover located under the carrier.
Figure 6:
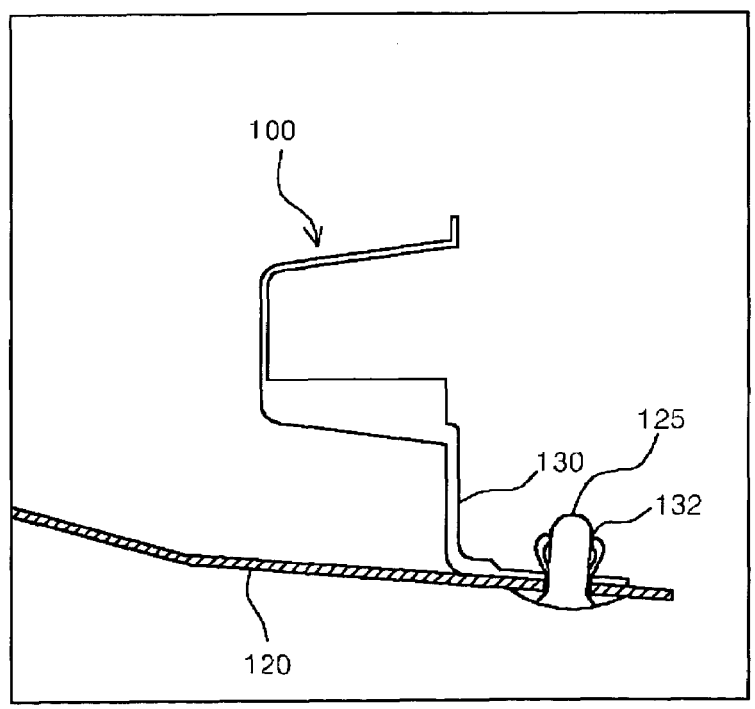
FIG. 6 is a cross-sectional view taken along the line B—B of FIG. 5.

FIG. 4 is a front view of a carrier for vehicles in accordance with the present invention. FIG. 5 is an enlarged view illustrating connection between the carrier of the present invention and a bumper cover located under the carrier. FIG. 6 is a cross-sectional view taken along line B—B of FIG. 5.

As shown in FIGS. 4 and 5, a carrier mounting structure in accordance with the present invention comprises a carrier 100 provided in front of an engine compartment of a car body for fixing electric components on a car, a bumper cover 120 located below the carrier 100 for absorbing impact generated in external collisions, and a plurality of knobs 130 extended from a lower surface of the carrier 100 and connected to the bumper cover 120. Here, the knobs 130 are formed integrally with the carrier 100.

As shown in FIG. 4, the carrier 100 is installed in the car body in front of the engine compartment, and includes headlight-receiving portions 111 and cooling module-receiving portions 112.

An upper frame 113 is formed on upper surfaces of the cooling module-receiving portions 112 of the carrier 100, and a lower frame 115 is formed on lower surfaces of the cooling module-receiving portions 112 of the carrier 100.

Further, the upper frame 113 and the lower frame 115 are connected and supported by a supporting bracket 114.

The knobs 130 are extended from a lower surface of the lower frame 115 such that the knobs 130 are spaced from each other by a designated interval.

As shown in FIGS. 5 and 6, the knobs 130 are formed integrally with the lower frame 115.

The knobs 130 are vertically extended downward from the lower surface of the lower frame 115 by a designated distance, and are then bent frontward at an angle of 90° (with reference to FIGS. 5 and 6).

That is, each of the knobs 130 has an L-shaped structure as viewed from the side.

One end of each of the knobs 130 is in surface contact with the bumper cover 120.

Then, the end of each of the knobs 130 is fixed to the bumper cover 120 by means of a retainer 125.

That is, a through hole 132 is formed through the end of each of the knobs 130 and a portion of the bumper cover 120 corresponding to the end, and then the bumper cover 120 is located such that the through holes 132 of the bumper cover 120 correspond to the through holes 132 of the ends of the knobs 130. Thereafter, the retainers 125 are inserted into the through holes 132 of the bumper cover 120 and the ends of the knobs 130 so that the ends of the knobs 130 are fixed to the bumper cover 120.

The knobs 130 are made of a rigid material so as to simultaneously support the carrier 100 and the bumper cover 120.

Support protrusions 134 are formed on an inner surface of each of the knobs 130, thereby strengthening the rigidity of the knobs 130.

As shown in FIG. 5, the support protrusions 134 are formed on inner surfaces of front and upper portions of each of the knobs 130, and then portions of the support protrusions 134 formed on the inner surface of the front portion of each of the knobs 130 are connected to corresponding portions of the support protrusions 134 formed on the inner surface of the upper portion of each of the knobs 130.

The support protrusions 134 of the knobs 130 serve to increase the thickness of the knobs 130, thereby reinforcing the rigidity of the knobs 130.

Preferably, a pair of the support protrusions 134 are formed on the inner surface of each of the knobs 130 so that the support protrusions 134 are located adjacent to the through hole 132.

As apparent from the above description, the present invention provides a carrier mounting structure, in which knobs for connecting the lower frame of a carrier to a bumper cover are extended from the lower frame so that a connection step between the knobs and the lower frame is omitted, thereby reducing assembly time and improving productivity of the carrier.

Further, the carrier mounting structure is designed such that the knobs are formed integrally with the lower frame, thus preventing workers from bending their backs in order to assemble the carrier with the bumper cover.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A carrier mounting structure comprising:
   a carrier provided in front of an engine compartment of a car body, that fixes electric components of a car;
   a bumper cover located below the carrier, that absorbs impact generated in a collision of the car; and
   a plurality of knobs extending from a lower surface of the carrier, and connected to the bumper cover,
   wherein the knobs are formed integrally and in one piece with the carrier.

2. The carrier mounting structure as set forth in claim 1, wherein each of the knobs has an L-shaped structure, and includes support protrusions that maintain the rigidity of the knobs.

* * * * *